No. 812,429. PATENTED FEB. 13, 1906.
J. W. KOCH.
NUT LOCK.
APPLICATION FILED AUG. 16, 1904.
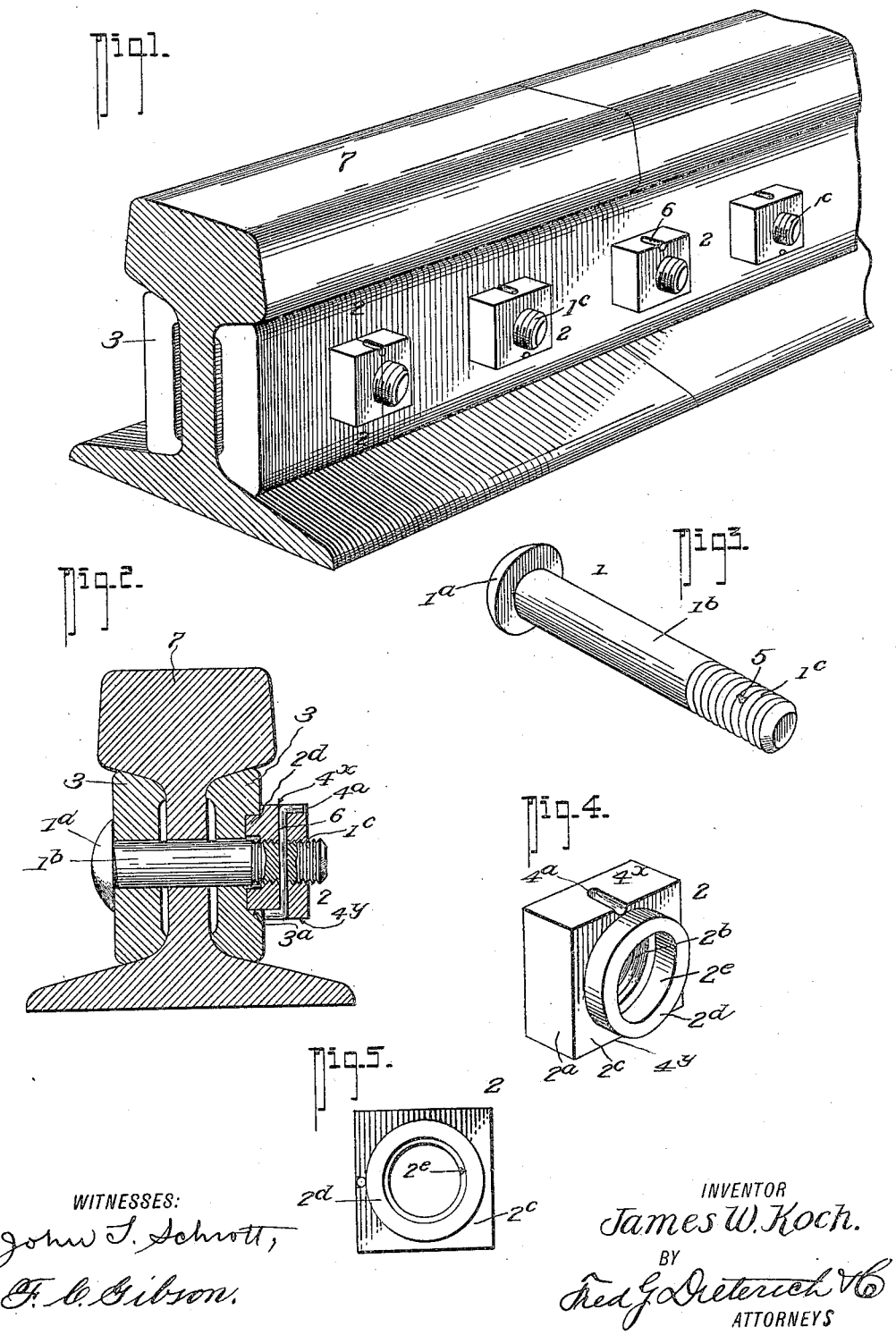
WITNESSES:
John T. Schrott,
F. C. Gibson.
INVENTOR
James W. Koch.
BY
Fred G. Dieterich & Co.
ATTORNEYS

UNITED STATES PATENT OFFICE.

JAMES W. KOCH, OF REYNOLDS, PENNSYLVANIA.

NUT-LOCK.

No. 812,429.  Specification of Letters Patent.  Patented Feb. 13, 1906.

Application filed August 16, 1904. Serial No. 220,938.

*To all whom it may concern:*

Be it known that I, JAMES W. KOCH, a citizen of the United States, residing at Reynolds, in the county of Schuylkill and State of Pennsylvania, have invented certain new and useful Improvements in Nut-Locks, of which the following is a specification.

My invention relates to certain new and useful improvements in bolt and nut locks in which means is provided for securing the nut and bolt together.

The invention also includes certain details of construction and arrangement of parts, all of which will be first described in detail and then specifically pointed out in the appended claims, reference being had to the accompanying drawings, in which—

Figure 1 is a perspective view of a portion of a rail-joint with my invention applied. Fig. 2 is a cross-section thereof on the line 2 2 of Fig. 1. Fig. 3 is a detail perspective view of the bolt. Fig. 4 is a similar view of the nut. Fig. 5 is a rear elevation of the nut.

Referring now to the accompanying drawings, in which like numerals of reference indicate like parts in all the figures, 1 designates the bolt, which may be of the ordinary construction and which is provided with the usual head $1^a$ and a shank $1^b$, which shank $1^b$ is threaded, as at $1^c$, to receive the nut 2. The nut 2 may be of any shape or form desired, either square, hexagonal, or octagonal, and the said nut 2 consists of a nut portion proper, $2^a$, which has a threaded axial bore $2^b$ for coöperating with the threaded portion $1^c$ of the bolt-shank $1^b$. Extending in a direction parallel to the bolt 1 and from the rear face $2^c$ of the nut 2 is an integrally-formed ring or washer member $2^d$, whose internal bore $2^e$ is of greater diameter than the threaded bore $2^b$ to prevent mashing or upsetting the threads of the bore should the ring become mashed at any time and whose external diameter is less than the diameter of the nut. The fish-plate 3 has a circular bore $3^a$ to receive the ring $2^d$, as shown in the drawings.

4 designates a bore which extends diametrically through the nut proper, $2^a$, and the said bore coöperates with the similarly-located bore 5 of the bolt 1, through which bores 4 and 5 the key 6, of wire or other suitable material, is adapted to pass. The bore 4 extends from one face $4^x$ of the nut to the diametrically opposite face $4^y$ and merges with supplemental grooves $4^a$ $4^a$ in the said nut-faces. These grooves $4^a$ $4^a$ in the form of my invention shown in Fig. 1, extend parallel to the axis of the bolt and are adapted to receive the bent-over ends $6^a$ $6^a$ of the key 6.

By reference to the drawings it will be seen the bolt 1 is passed through the plates 3 3 and the rail 7, after which the nut 2 is screwed home. The key 6 is then inserted through the bolt and nut bores, and the ends $6^a$ $6^a$ of the said key 6 are bent at right angles to lie in the grooves $4^a$ $4^a$ flush with the nut-face.

From the foregoing description, taken in connection with the accompanying drawings, it is thought the complete operation and advantages of my invention will be readily understood by those skilled in the art to which it appertains, and I desire it understood that slight changes in the detailed construction and arrangement of parts may be made without departing from the scope of the appended claims.

Having thus described my invention, what I claim, and desire to secure by Letters Patent, is—

1. A device of the character described, comprising in combination with a bolt having a threaded shank provided with a bore, a nut, said nut having a bore for coöperating with the bore in the bolt, and having grooves merging with said nut-bore at its ends, and a wire key passing through said bore and adapted to have its ends bent over into said grooves, and a ring integrally formed with said nut, said ring having a larger internal diameter than the nut axial bore and a lesser external diameter than the diameter of the nut, for the purposes described.

2. In combination with a rail and the fish-plates having alining apertures, a bolt passing therethrough, one of said fish-plates having countersunk portions at the nut-receiving end of the bolt, a nut having a threaded engagement with said bolt, a ring integrally formed with the nut projecting from the rear face thereof, the internal diameter of said ring being greater than the diameter of the threaded portion of the nut, and the external diameter of the ring being less than the diameter of the nut, said ring adapted to seat in the countersunk portion of the fish-plate, said nut and said bolt having alining apertures, the apertures of the nut extending diametrically therethrough, said nut having grooves on its opposite faces merging with the apertures of the nut and a key adapted to pass through said nut and bolt apertures and have its ends bent over into the nut-grooves to lock the nut and bolt together substantially as shown and described.

JAMES W. KOCH.

Witnesses:
C. F. SHINDEL,
GEO. SCHNAUSH.